United States Patent [19]
Lu et al.

[11] Patent Number: 6,125,211
[45] Date of Patent: Sep. 26, 2000

[54] PROGRESSIVE IMAGE TRANSMISSION

[76] Inventors: Chung-ya Lu; Kuei-ann Wen, both of 1001, Ta Hsueh Rd., Hsinchu, Taiwan

[21] Appl. No.: 08/931,476

[22] Filed: Sep. 16, 1997

[51] Int. Cl.$^7$ .................................................. G06K 9/36
[52] U.S. Cl. ........................ 382/241; 382/245; 382/251; 358/261.1
[58] Field of Search ................................ 382/241, 232, 382/233, 235, 236, 251, 245, 246, 248, 250, 253; 348/441, 415, 405; 345/418; 358/261.1, 433

[56] References Cited

U.S. PATENT DOCUMENTS

| | | | |
|---|---|---|---|
| 4,698,689 | 10/1987 | Tzou | 358/260 |
| 5,559,557 | 9/1996 | Kato | 348/405 |
| 5,598,514 | 1/1997 | Purcell et al. | 395/118 |
| 5,629,780 | 5/1997 | Watson | 358/432 |
| 5,684,893 | 11/1997 | Shikakura | 382/232 |
| 5,761,341 | 6/1998 | Go | 382/232 |
| 5,790,747 | 8/1998 | Kanota et al. | 386/123 |
| 5,802,213 | 9/1998 | Gardos | 382/239 |
| 5,812,195 | 9/1998 | Zhang | 348/415 |
| 5,832,120 | 11/1998 | Prabhakar et al. | 382/233 |
| 5,835,151 | 11/1998 | Sun et al. | 348/441 |

*Primary Examiner*—Christopher S. Kelley
*Assistant Examiner*—Kanji Patel
*Attorney, Agent, or Firm*—Bacon & Thomas

[57] ABSTRACT

Image to be transmitted is divided into blocks. The block size varies in each stage of transmission. The blocks are down-sampled to a fixed size for polynomial approximation coding (PAC). The PAC's are derived from a regressive model which is a statistical tool for data analysis. A two-dimensional polynomial equation is used to approximate the relation of the image data and their positions. The coefficients of the 2-D polynomial equation is coded and transmitted to represent the initial image. In the next stage, same or similar coding is conducted to the residual image. After a decided number of stages of transmission an approximated image is reconstructed. A novel iterative coding system for progressive image transmission is disclosed.

14 Claims, 11 Drawing Sheets

| RANGE | DC DIFFERENCE | AC |
|---|---|---|
| 0 | 0 | |
| -1, 1 | 1 | 1 |
| -3, -2, 2, 3 | 2 | 2 |
| -7, ..., -4, 4, ..., 7 | 3 | 3 |
| -15, ..., -8, 8, ..., 15 | 4 | 4 |
| -31, ..., -16, 16, ..., 31 | 5 | 5 |
| -63, ..., -32, 32, ..., 63 | 6 | 6 |
| -127, ..., -64, 64, ..., 127 | 7 | 7 |
| -225, ..., -128, 127, ..., 225 | 8 | 8 |

Fig. 7

| NO. | BASIC CODE | LENGTH |
|---|---|---|
| 0 | 00 | 2 |
| 1 | 01 | 3 |
| 2 | 10 | 4 |
| 3 | 110 | 6 |
| 4 | 1110 | 8 |
| 5 | 11110 | 10 |
| 6 | 111110 | 12 |
| 7 | 1111110 | 14 |
| 8 | 1111111 | 15 |

Fig. 8

| Run/Category | BASIC CODE | LENGTH | Run/Category | BASIC CODE | LENGTH |
|---|---|---|---|---|---|
| EOB | 00 | 2 | | | |
| 0/1 | 100 | 4 | 1/5 | 11111111010 | 16 |
| 0/2 | 01 | 4 | 1/6 | 111111111001 | 18 |
| 0/3 | 101 | 6 | 1/7 | 1111111111010 | 19 |
| 0/4 | 1100 | 8 | 1/8 | 1111111111011 | 20 |
| 0/5 | 11111100 | 13 | 2/1 | 11101 | 6 |
| 0/6 | 11111111000 | 17 | 2/2 | 11110 | 7 |
| 0/7 | 11111111001 | 18 | 2/3 | 11111110 | 11 |
| 0/8 | 111111111000 | 20 | 2/4 | 111111111011 | 15 |
| 1/1 | 1101 | 5 | 2/5 | 111111111100 | 17 |
| 1/2 | 11100 | 7 | 2/6 | 111111111101 | 18 |
| 1/3 | 111110 | 9 | 2/7 | 1111111111110 | 19 |
| 1/4 | 11111101 | 12 | 2/8 | 1111111111111 | 20 |

Fig. 9

| TRANSMISSION LEVEL | PAC-PIT | | HM-JPEG | |
|---|---|---|---|---|
| | Bit-rate (bpp) | PSNR (dB) | Bit-rate (bpp) | PSNR (dB) |
| First stage | 0.046 | 23.12 | 0.146 | 23.80 |
| Second stage | 0.142 | 26.57 | 0.403 | 28.46 |
| Third stage | 0.345 | 30.13 | ... | ... |

Fig. 11

| Run/Category | BASIC CODE | LENGTH | Run/Category | BASIC CODE | LENGTH |
|---|---|---|---|---|---|
| EOB | 0 | 1 | | | |
| 0/1 | 100 | 4 | 2/1 | 11101 | 6 |
| 0/2 | 1100 | 6 | 2/2 | 1111100 | 9 |
| 0/3 | 1101 | 7 | 2/3 | 111111001 | 12 |
| 0/4 | 1111010 | 11 | 2/4 | 11111110110 | 15 |
| 0/5 | 1111110110 | 15 | 2/5 | 11111110111 | 16 |
| 0/6 | 11111110000 | 17 | 2/6 | 11111111000 | 17 |
| 0/7 | 11111110001 | 18 | 2/7 | 11111111001 | 18 |
| 0/8 | 11111110010 | 19 | 2/8 | 11111111010 | 19 |
| 1/1 | 101 | 4 | 3/1 | 111100 | 7 |
| 1/2 | 11100 | 7 | 3/2 | 1111101 | 9 |
| 1/3 | 1111011 | 10 | 3/3 | 111111010 | 12 |
| 1/4 | 111111000 | 13 | 3/4 | 11111111011 | 15 |
| 1/5 | 1111110111 | 15 | 3/5 | 11111111100 | 16 |
| 1/6 | 11111110011 | 17 | 3/6 | 11111111101 | 17 |
| 1/7 | 11111110100 | 18 | 3/7 | 11111111110 | 18 |
| 1/8 | 11111110101 | 19 | 3/8 | 11111111111 | 19 |

Fig. 10

PROGRESSIVE IMAGE TRANSMISSION

FIELD OF THE INVENTION

The present invention relates to a method and a device for progressive image transmission, and especially to a progressive image transmission technology using an iterative operation encode and to retrieve image files.

BACKGROUND OF THE INVENTION

Progressive image transmission (PIT) has been widely developed to serve many applications, such as remote image database access, telebrowsing and teleconferencing over relatively low bit-rate channels. In general, transmission of an image file is divided into stages and at the first stage a coarse low resolution image is transmitted as an initial approximation. The resolution of the image is refined by sending more stages. The image is transmitted progressively in order to give a better approximation to the original image.

In the conventional art, many PIT techniques have been proposed and they can be roughly classified into three categories: the pyramidal approach, the transform-based approach and the iterative encoding approach.

In the pyramidal approach, the levels of the pyramid correspond to the successive approximations of the original image. The image can be progressively reconstructed by adding levels of the pyramid to the top level. Reference may be made to: K. H. Tan et al., "Layered image coding using the DCT pyramid", IEEE Trans. Image Process, 4(4), April 1995, pp. 512–516.

In the transform-based approach, the image first undergoes a block transform and the transformed coefficients are transmitted progressively in a certain order, usually from-low-to-high order. In this manner, successive approximation to the original image with progressively high resolution is obtained by inversely transforming the coefficients at each order. Reference may be made to: A. Jain et al., "Scaleable compression for image browsing", IEEE Trans. Consumer Electron, 40(3), August 1994, pp. 394–404.

In the third approach, the residue or difference image of the image file is encoded, either in the spatial domain or in the transform domain. At each stage, an error image or a difference image between the original image and the transmitted image is generated and then encoded at the next stage. Reference may be made to: L. Wang et al., "Lossless progressive image transmission by residual error vector quantization", IEEE Proceedings 135(Pt. F.5), October, 1988, pp. 421–430.

Among the above three approaches, the iterative encoding approach is widely used in the industry due to the fact that the iterative operation can be conducted by a computer at a high speed. The iterative coding approach, however, requires large number of data and thus consumes long operation time.

There is thus a need in the industry to provide a novel iterative coding system for progressive image transmission to enhance the efficiency of processing.

There is also a need to have a simplified iterative coding system for progressive image transmission so that data required in the processing may be reduced.

OBJECTIVES OF THE INVENTION

The purpose of this invention is to provide a novel method for progressive image transmission.

Another purpose of this invention is to provide a new iterative coding system to enhance the efficiency of progressive image transmission.

Another purpose of this invention is to provide a simplified method for progressive image transmission whereby data required may be reduced and the quality of transmitted image may be enhanced.

Another purpose for a this invention is to provide a novel structure of progressive image transmission device.

SUMMARY OF THE INVENTION

According to the present invention, a novel iterative coding system for progressive image transmission is disclosed. In the present invention, the image file to be transmitted is first divided into blocks. The block size varies in each stage of transmission. The divided blocks are downsampled to a fixed size for polynomial approximation coding (PAC). The PAC's are derived from a regressive model which is a statistical tool for data analysis. A two-dimensional polynomial equation is used to approximate the relation of the image data and their positions. The coefficients of the 2-D polynomial equation are transmitted to represent the initial image to be transmitted. In the next stage, same or similar coding is conducted to the residual image. After a decided number of stages of transmission an approximated image is transmitted.

These and other purposes and advantages of this invention can be fully understood from the detailed description of the invention by referring to the following drawings.

IN THE DRAWINGS.

Table 1 shows the standard codes of the coefficients for the polynomial approximation coding system applicable in this invention.

Table 2 shows the standard DC codes for the polynomial approximation coding system, used in the embodiments of this invention.

Table 3 shows the standard AC codes for the polynomial approximation coding system, used in the first stage of transmission of the embodiments of this invention.

Table 4 shows the standard general codes for the polynomial approximation coding system, used in the second and following stages of transmission of the embodiments of this invention.

DETAILED DESCRIPTION OF THE INVENTION

Block Division.

In the progressive image transmission system of the present invention, the image is transmitted in stages. In each stage of transmission the image to be transmitted is first divided into blocks. Preferably, each block has the same size at the same stage and every blocks doesn't overlap with other blocks. The blocks so divided will be deemed objects of the following processing and transmission.

Approximation.

In most applications of this invention, the image is transmitted for remote or long-distanced playback. The playback function should be a discrete function. In the present invention, however, the discrete values of each block is embedded into a continuous function f(x,y) defined on the unit square surrounding every pixel. A two-dimensional polynomial function p(x,y) is used to approximate the continuous function f(x,y), as follows:

$$f(x,y)=p(x,y)+e(x,y) \qquad (1)$$

wherein e(x,y) denotes the error term.

The two-dimensional equation may be expressed generally by:

$$p(x, y) = \sum_i \sum_j \beta_{i,j} x^i y^j \qquad (2)$$

where $\beta_{ij}$ denotes the polynomial coefficients.

In this invention, only the coefficients are transmitted. At the recipient site, the coefficients are retrieved according to equation (2) and an approximation image $\hat{p}(x,y)$ is obtained.

Transmission System.

The polynomial approximation coding is based on the estimation of polynomial coefficients, followed by quantization and variable-length coding. At the recipient site the received bits stream is converted to a series of quantified polynomial coefficients. These polynomial coefficients are used to recover the original data by the polynomial equation with adequate position value (x,y) to obtain a retrieved approximation image.

Figure 1:
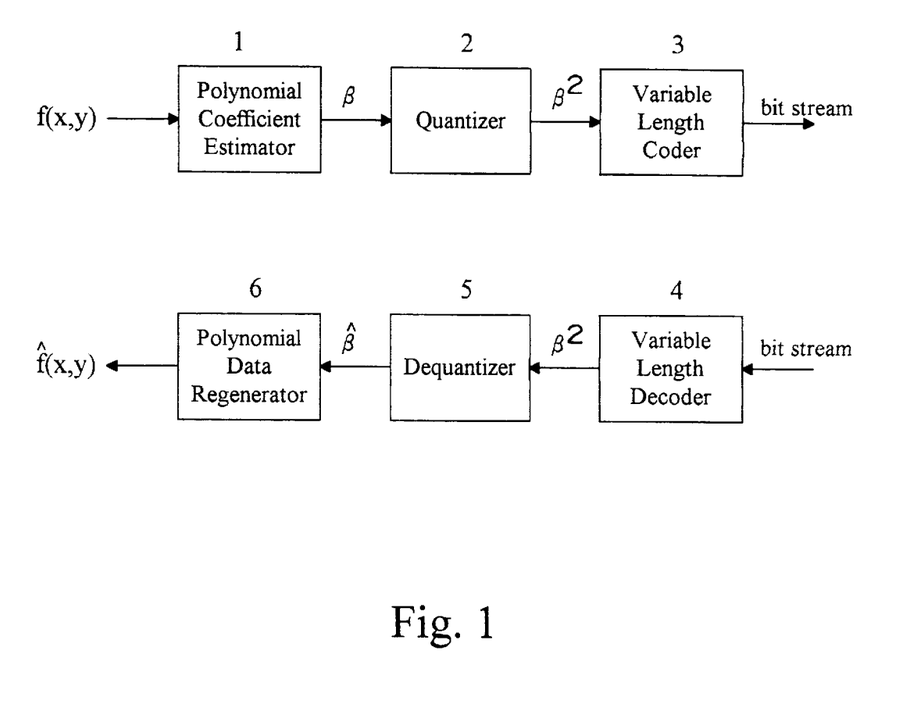
FIG. 1 illustrates the block diagram of the progressive image transmission system of this invention.

FIG. 1 illustrates the block diagram of the progressive image transmission system of this invention. As shown in the figure, the progressive image transmission system of this invention comprises a polynomial coefficient estimator (PCE) 1, a quantifier 2 and a variable-length encoder 3 at the transmission site and a variable-length decoder 4, a dequantifier 5 and a polynomial data regenerator 6 at the recipient site. The image to be processed, f(x,y), is first processed by the PCE 1 to obtain a matrix of its polynomial coefficients β which is then quantified by the quantifier 2 to obtain a matrix of the quantified coefficients $\beta^2$. The quantified coefficients are coded by the encoder 3 to obtain a bits stream which is then transmitted to the recipient site.

At the recipient site, the bits stream is first decoded by the decoder 4 to have the quantifier coefficients $\beta^2$ which is then dequantified to $\hat{\beta}$ by the dequantifier 5. The coefficients are then reconstructed by the polynomial data regenerator 6 to have an approximation image $\hat{p}(x,y)$. After several stages of reconstruction, an approximation image $\hat{f}(x,y)$ is generated by the polynomial data regenerator 6.

Determination of Coefficients β.

$$\text{Let } p(x,y)=\beta_0+\beta_1 x+\beta_2 y+\beta_3 xy \qquad (3)$$

At the end of the encoder 1, the polynomial coefficients are obtained by the regression technique. Here we define the matrix from of the polynomial approximation as follows:

$$F=Xb+e \qquad (4)$$

Wherein:

F is the original image;

$F^T=[f_1,f_2,\ldots,f_n]$ represents an original data matrix with n elements and n>0;

$$X = \begin{bmatrix} 1 & x_1 & y_1 & x_1 y_1 \\ 1 & x_2 & y_2 & x_2 y_2 \\ \vdots & \vdots & \vdots & \vdots \\ 1 & x_n & y_n & x_n y_n \end{bmatrix}$$

is a constant matrix formed by the position variables;

$b^T=[\beta_0,\beta_1,\beta_2,\beta_3]$ is the coefficient matrix;

$e^T=[e_1,e_2,\ldots,e_n]$ is the error term matrix; and T represents number of the transmission stages.

After some simple numerical procedures, the least square estimation of the polynomial coefficient vector b is obtained by the following equation:

$$b=(X^T X)^{-1} X^T F \qquad (5)$$

Since the elements of the X matrix are fixed, equation (5) may be replaced by a position generator matrix G, $G=(X^T X)^{-1} X^T$, so that the polynomial coefficient vector b can be expressed by b=GF.

As to the retrieving process, the image can be reconstructed according to equation (3). In other words, the reconstructed data matrix $\hat{F}$ of the interpolation or decimation can be directly obtained by the following equation:

$$\hat{F}=\hat{X}b \text{ where}$$

$$X = \begin{bmatrix} 1 & x_1 & y_1 & x_1 y_1 \\ 1 & x_2 & y_2 & x_2 y_2 \\ \vdots & \vdots & \vdots & \vdots \\ 1 & x_m & y_m & x_m y_m \end{bmatrix}$$

and $\hat{x}$ and $\hat{y}$ are the position mapping variables of the extension decoding for the interpolation or decimation.

This means, for a set of fixed polynomial coefficients, the interpolation of data is implemented by polynomial equation with the interpolation of the set of (x,y).

Division of Residual Image Data.

In the progressive image transmission system of this invention, a series of residual image frames are transmitted. Let $\{\hat{f}^k, k>0\}$ represent the series of the images frames where $\hat{f}^k$ is the transmitted image at stage k. We further let $Ff^1$ represent the original image. In ideal cases, $$f^1 = \sum_{k>0} \hat{f}^k$$

but in actual cases, the transmission is limited to a certain number of stages m. We thus have:

$$f^1 = \sum_{k=1}^{m} \hat{f}^k + f^R$$

where represents the error image in this m-stage transmission system.

Let $f^k$ denote the residual image frame at stage k. Thus the residual image frame at the next stage is generated by $f^{k+1}=f^k-\hat{f}^k$. The progressively reconstructed image can be expressed as $\hat{F}^k=\hat{F}^{k-1}+\hat{f}^k$ wherein $\hat{F}^1=f^1$.

In this invention, the image to be transmitted is divided into blocks for processing. The residual image frame, in turn, is derived from the divided blocks where each residual image frame $f^k$ consists of a series of non-overlapped blocks $\{X_l^k, 1 \leq l \leq N_k\}$ where $N_k$ is the number of blocks at frame $f^k$. The block size of each frame varies in each stage in order to refine the process. For the sake of convenience, let $N_{k-1}=4N_k$. That is, if the size of $X^k$ is (2M×2M) at stage k, the size in $X^{k+1}$ is M×M.

Device and Process of Progressive Image Transmission.

Figure 2:
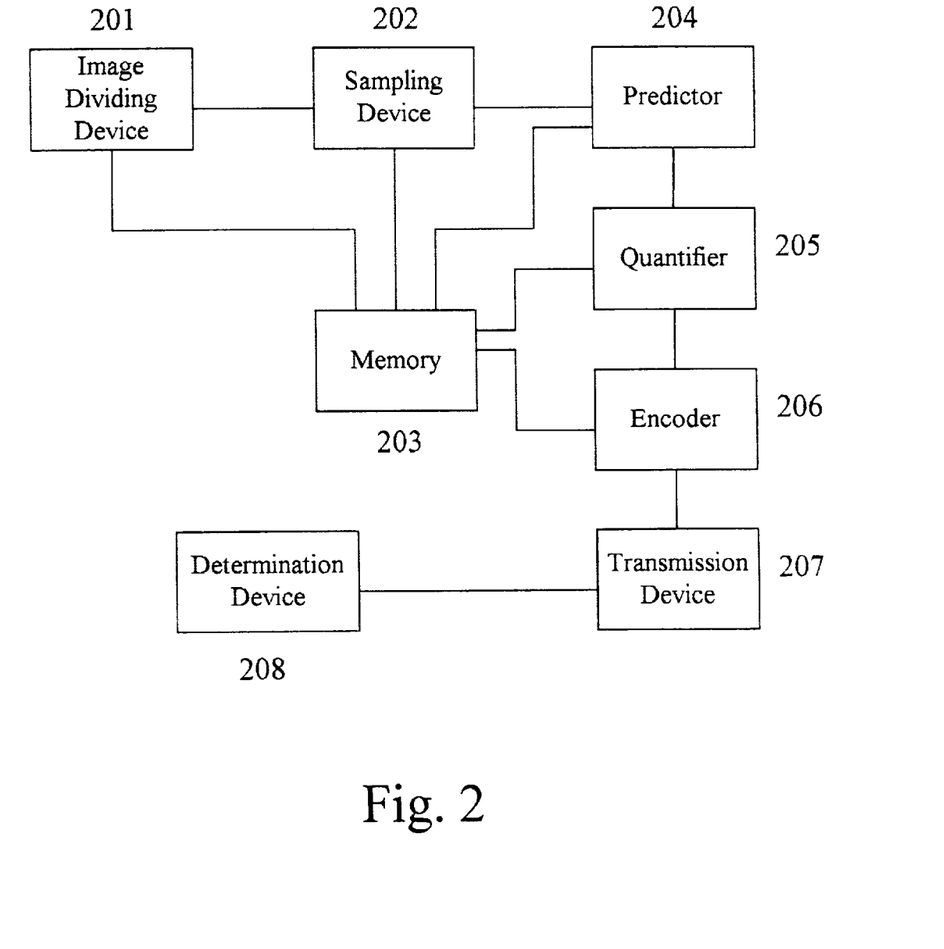
FIG. 2 illustrates the system schematics of the progressive image transmission device of this invention.

FIG. 2 illustrates the system schematics of the progressive image transmission device of this invention. As shown in the figure, the progressive image transmission device of this invention comprises: an image dividing device 201, a sampling device 202, a memory 203, a predictor 204, a quantifier 205, an encoder 206, a transmission device 207 and a determination device 208. In this figure, the predictor 204, the quantifier 205 and the encoder 206 have similar functions with the PCE 1, the quantifier 2 and the variable-length encoder 3 in FIG. 1, respectively.

Figure 3:
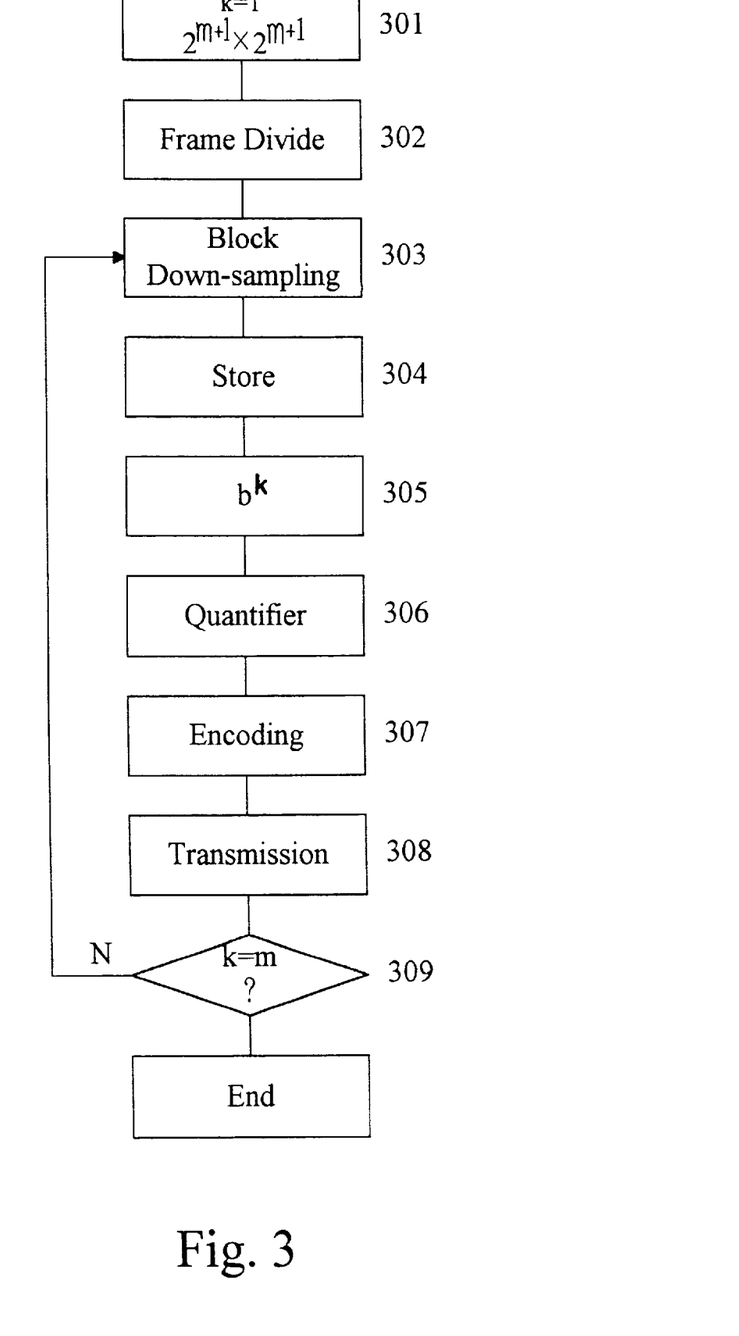
FIG. 3 illustrates the flow chart of the method for progressive image transmission of this invention.

FIG. 3 shows the flow chart of the method for progressive image transmission of this invention. The following is a description of the progressive image transmission system of this invention will follow the flow chart of FIG. 3 by referring to FIG. 2.

At 301, the number of stages of the transmission m is decided and the variable of the stage k is set to 1. The number of blocks to be divided N is decided where $N=2^{(m+1)} \times 2^{(m+1)}$. At 302 the image dividing device 201 divides the residual image frame $f^k$ ($f^1$ is the original image F) into N blocks. For example, if k=1, then N=16. Preferably the N blocks are not overlapping one another. At 303 the sampling device 202 down-samples the blocks. In the embodiment of this invention, the down-sampling is conducted with a 4*4 pixel mask and one pixel is picked up from the mask to represent the mask. At 304 the down-sampled image is stored in the memory 203. At 305 the predictor (204) encodes the down-sampled image (blocks) with a two-dimensional polynomial equation, as follow:

$$f^k = Xb^k + e^k$$

At 306 the quantifier (205) quantifies the coefficient matrix $b^k$ to obtain the numeric values of the coefficients. The numeric values of the coefficients may be the nearest integral numbers of the coefficients or any value that is decided by an applicable prediction technology. At 307 the encoder (206) encodes the numeric numbers of the coefficients into variable-length codes. In the coding process, a look-up-table may be used. In determining the codes, the more frequently a code exists the shorter length of the code will be given. A tree coding system may be applicable in this invention to effectively divide the codes. Other coding systems may be applicable to this invention, as long as they give the same or similar effects.

At 308 the transmission device 207 transmits the encoded codes of the coefficients. While the codes are received by the recipient site, a down-sampled, approximation image $\hat{f}^k$ can be reconstructed, $\hat{f}^k = \Sigma Xb^k$. At 309 the determination device 208 determines whether k is equal to m. If yes, the process will be stop; Otherwise, let k=k+1 and N=N/2. Steps 303 to 309 will be repeated.

At stage k+1, the image to be processed is the residual image between the original image ($f^1$) and the reconstructed image ($\hat{f}^k$), $f^{k+1}$, $f^{k+1} = f^1 - \hat{f}^k$.

Steps 303 to 309 are repeated and the coefficients of stage k+1 ($b^{k+1}$) is transmitted. At this stage, $N=\frac{1}{2}(2^{(m+1)} \times 2^{(m+1)})$. If after the transmission, k is still less than m, steps 303 to 309 will be repeated.

Coding of the Coefficients.

In order to enhance the speed of processing, the present invention provides a novel coding system for the coefficients. In the processing, the original image is approximated by a continuous function, as follows:

$$p(x,y) = \beta_0 + \beta_1 x + \beta_2 y + \beta_3 xy \qquad (3)$$

The coefficients in equation (3) are quantified and encoded before transmission. In coding the coefficients, the embodiments of the invention use a 9-code system to estimate the quantified coefficients $\beta_0$, $\beta_1$, $\beta_2$ and $\beta_3$. Table 1 shows the standard codes of the coefficients for the polynomial approximation coding system used in the embodiments of in this invention. The standard codes shown in Table 1 is obtained from static data of a number of image files. This coding system provides the effect of reducing the bit-rate of the image files and is applicable to most image files.

After the standard codes of the coefficients are obtained, the encoder uses a special encoding system to transform the codes into binary format. Tables 2–4 show the encoding system as used in the embodiments of this invention. In the tables, Table 2 shows the standard DC codes ($\beta_0$) of the coding system, Table 3 shows the standard AC codes ($\beta_1$ to $\beta_3$) of the coding system, used in the first stage of transmission and Table 4 shows the standard AC codes of the coding system, used in the second and following stages of transmission. All these tables are taken for reference in this invention. Other coding systems may also be used in this invention, so far as they provide the same or similar effects.

After the encoding of the polynomial coefficients, there are two data paths: the variable length codes (VLC) which is used to reduce the bit rates; and the inverse and reconstruction data which is used in the inverse quantification and the polynomial reconstruction of the approximation image.

EMBODIMENT

Figure 4:
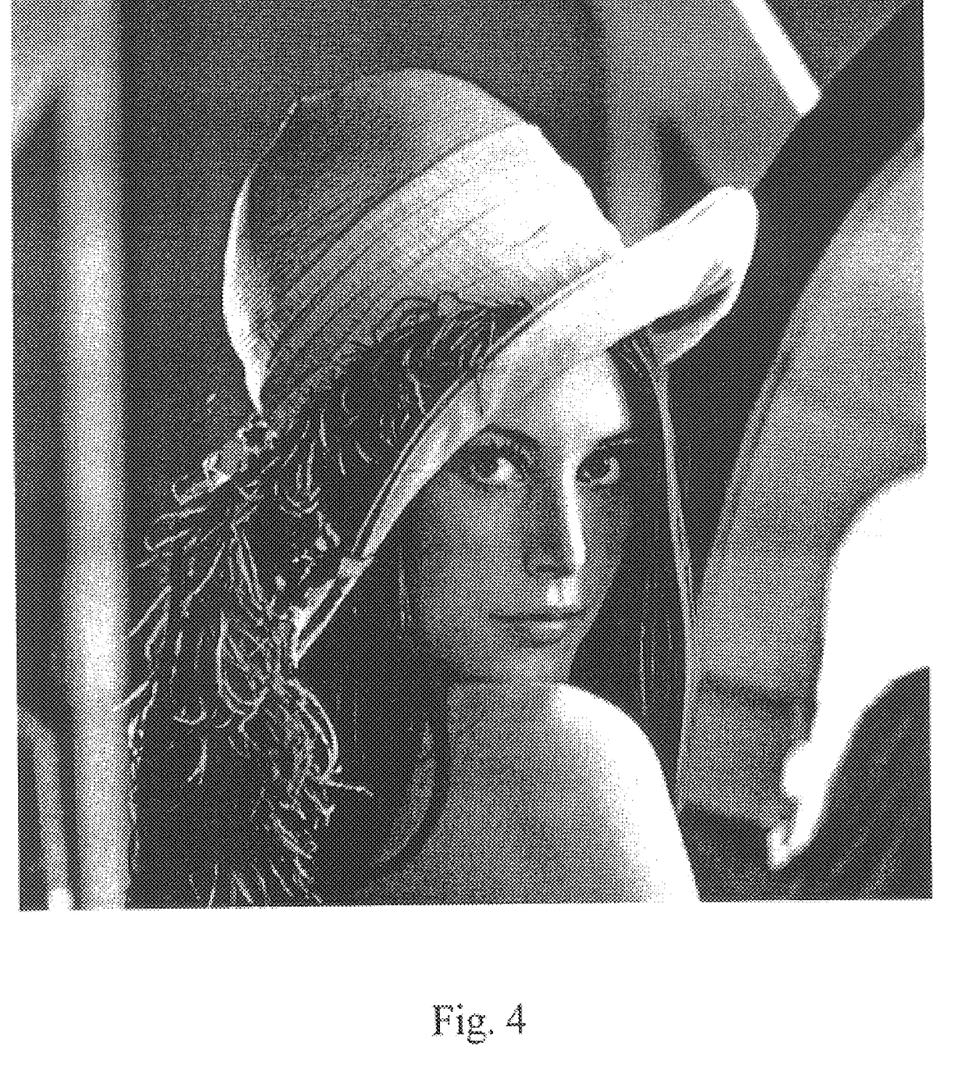
FIG. 4 shows "Lena", an image to be transmitted.

High-level language simulation using the progressive image transmission technology of this invention is presented. The image to be transmitted "Lena" is shown in FIG. 4. This image is sized 512*512 pixels and each pixel is expressed with 256 gray levels.

In this embodiment, the transmission is divided into three stages (m=3). The original image is first divided into 16*16 blocks, each block having 32*32 pixels. The blocks are divided from up to down and from left to right.

In the down-sampling, each 1024 pixel block is masked by a 4*4 pixel mask. The most left-up pixel is picked up from each mask. The down-sampled blocks are embedded into equation (3) so that the coefficients are obtained. The coefficients are quantified and coded according to the codes in Table 1. In particular, the nonzero AC coefficients are encoded using a variable-length code system that defines the coefficient's value and number of the preceding zeros. The DC coefficients are differentially coded relatively to the DC coefficients of the previous sub-image. Tables 2 and 3 show the default PAC Huffman codes at the first stage. In the second and third stages (and thereafter, if any), all the polynomial coefficients are coded by the same PAC Huffman codes as shown in Table. 4.

Figure 5A:
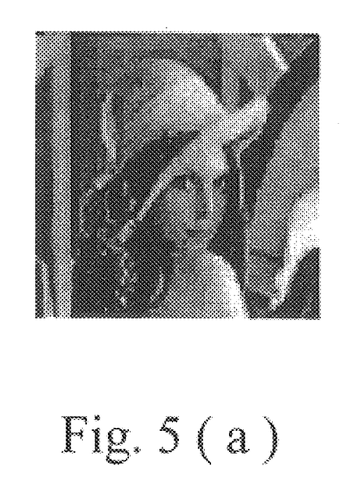
FIG. 5(a) shows the reconstructed image of "Lena" with 128*128 pixels under the first stage of transmission.
Figure 5B:
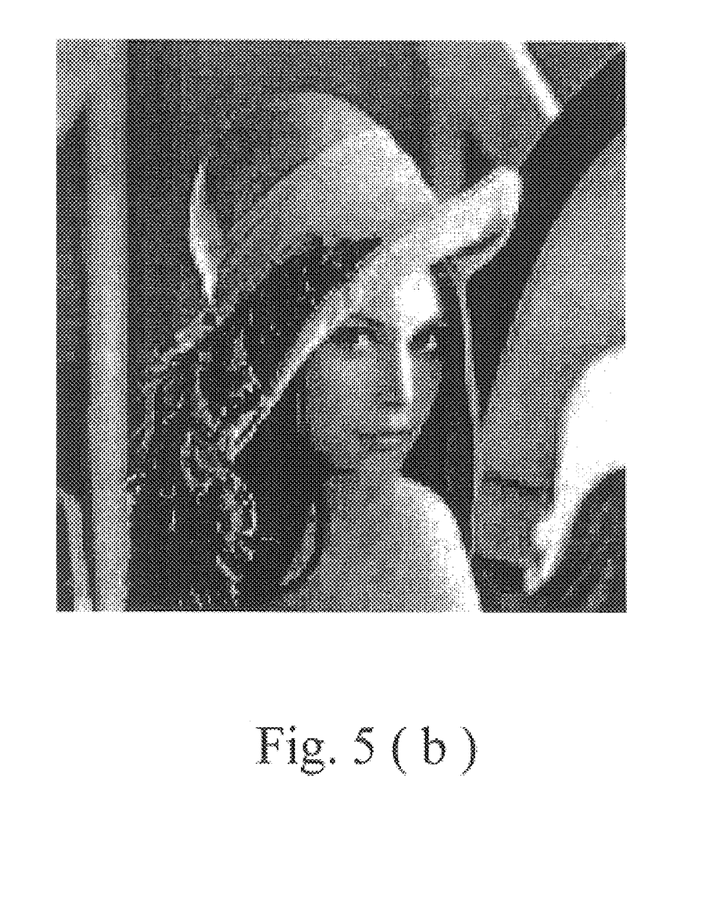
FIG. 5(b) shows the reconstructed image of "Lena" with 256*256 pixels under the second stage of transmission.
Figure 6A:
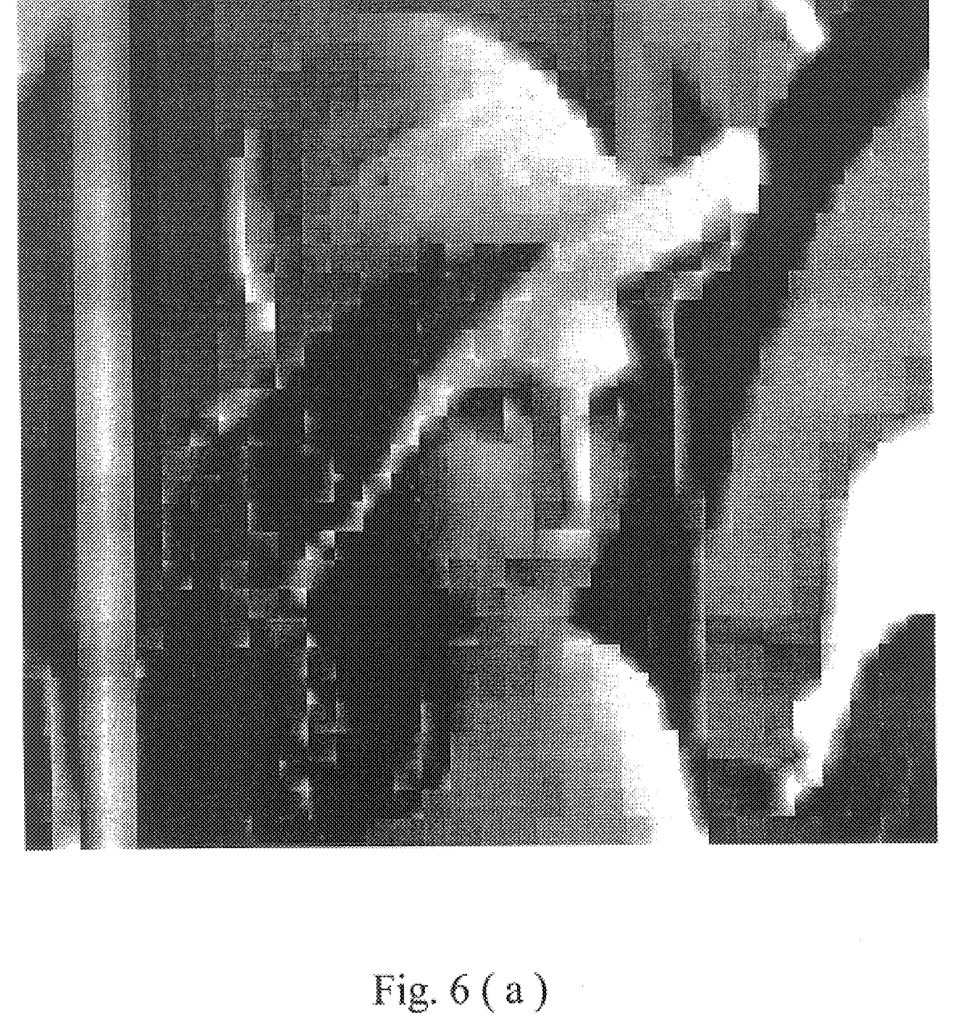
FIGS. 6(a)–6(c) respectively show the reconstructed image of "Lena" with 512*512 pixels under the first, second and third stages of transmission.
Figure 6B:
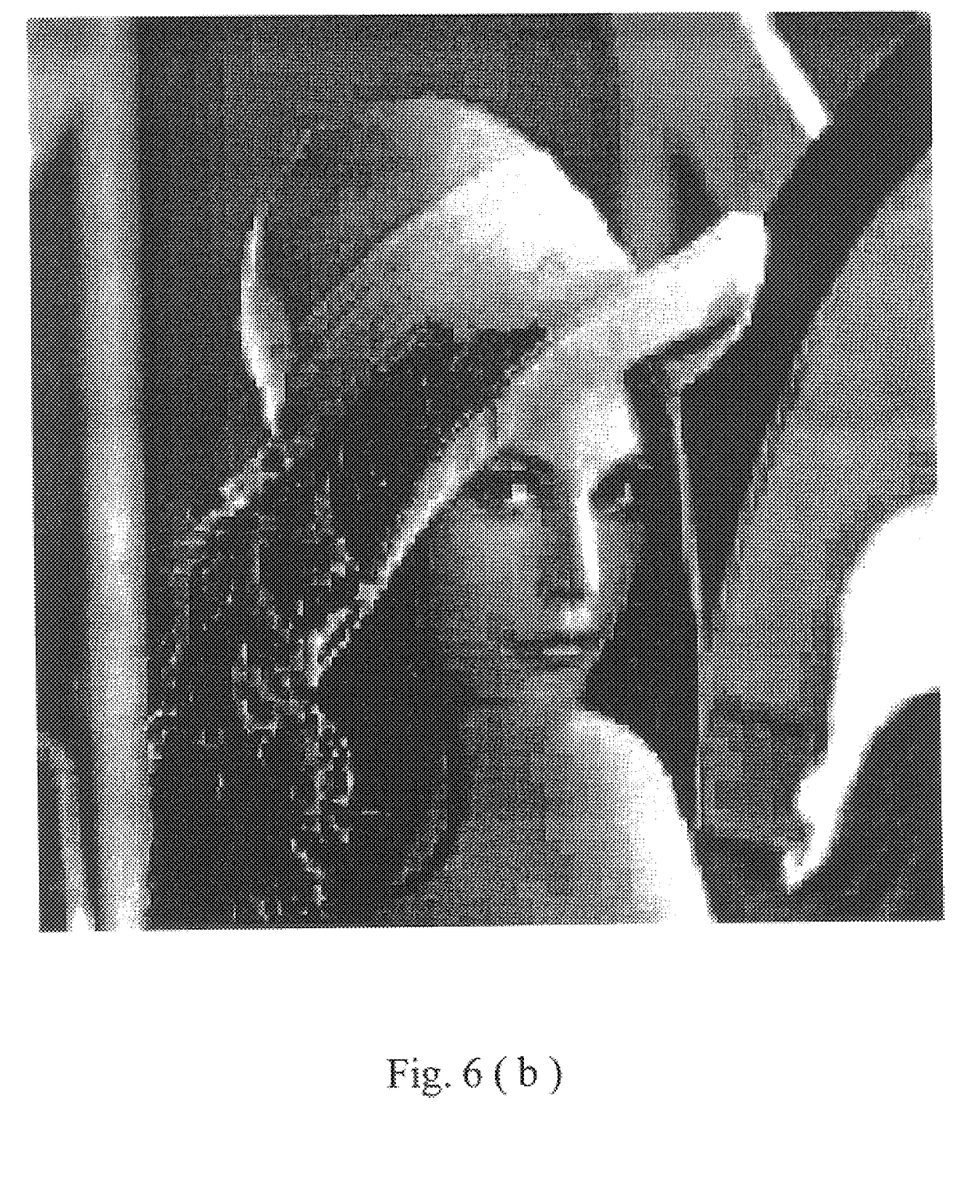
Figure 6C:
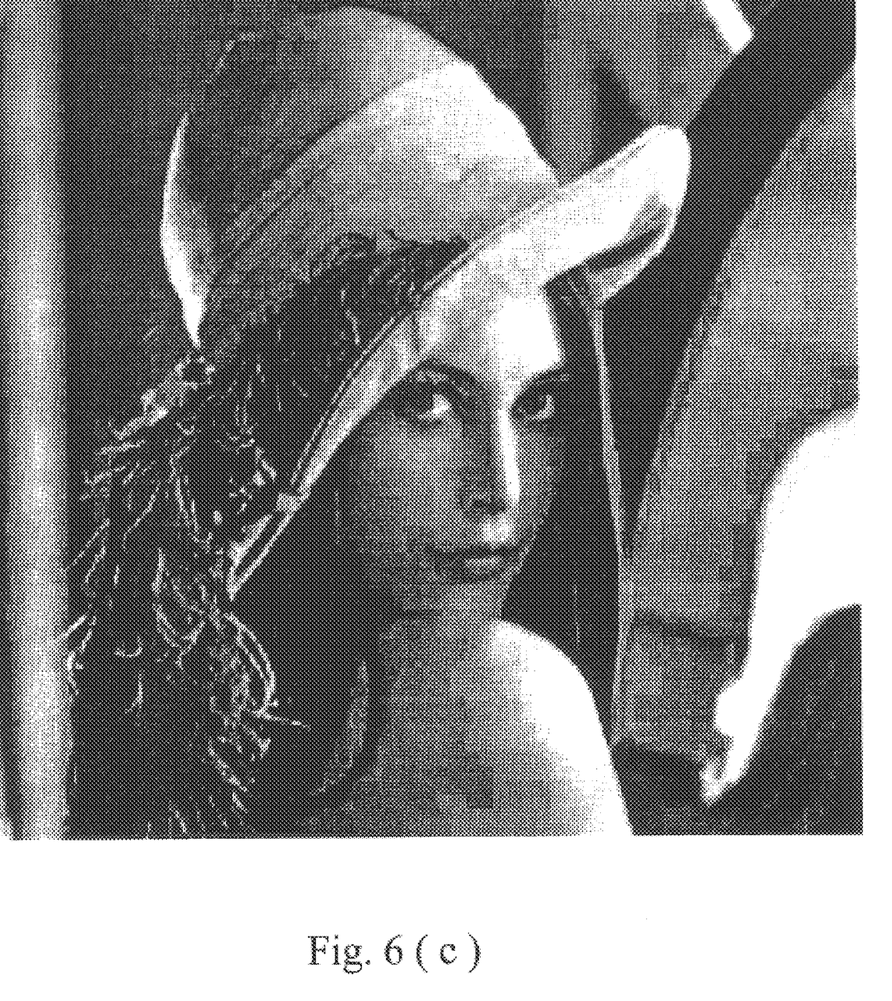
Figure 7:
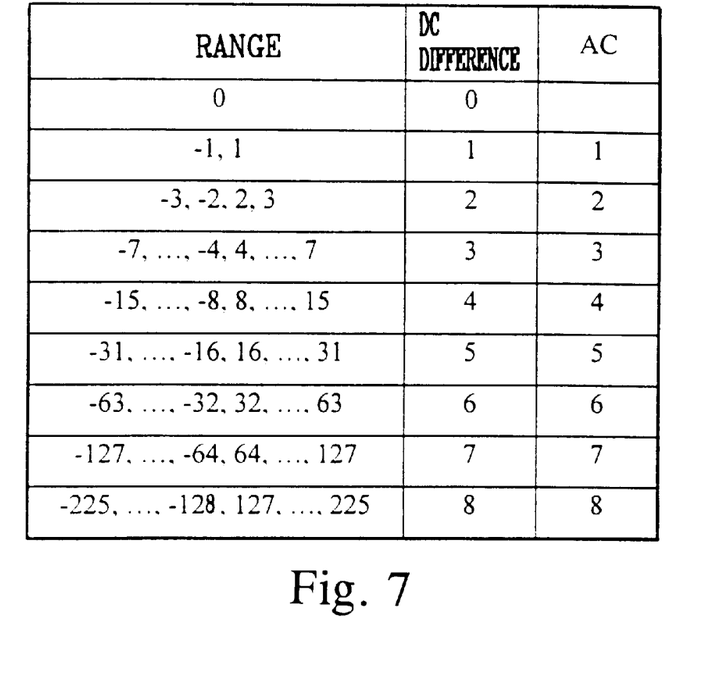
Figure 8:
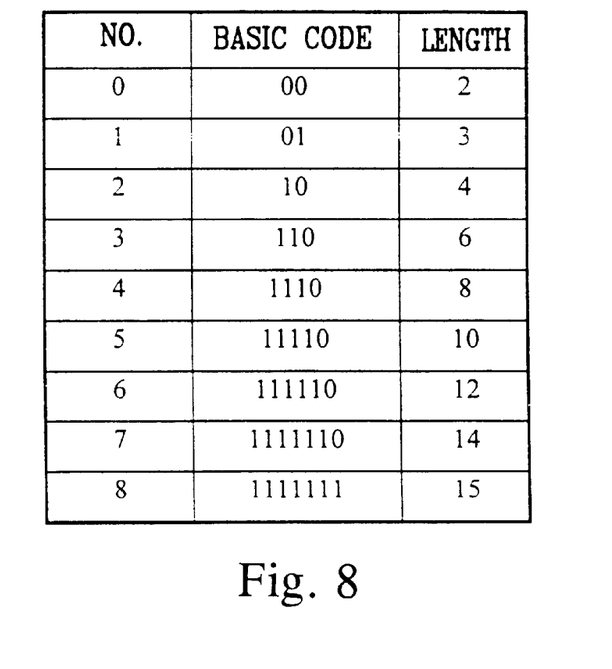
Figure 9:
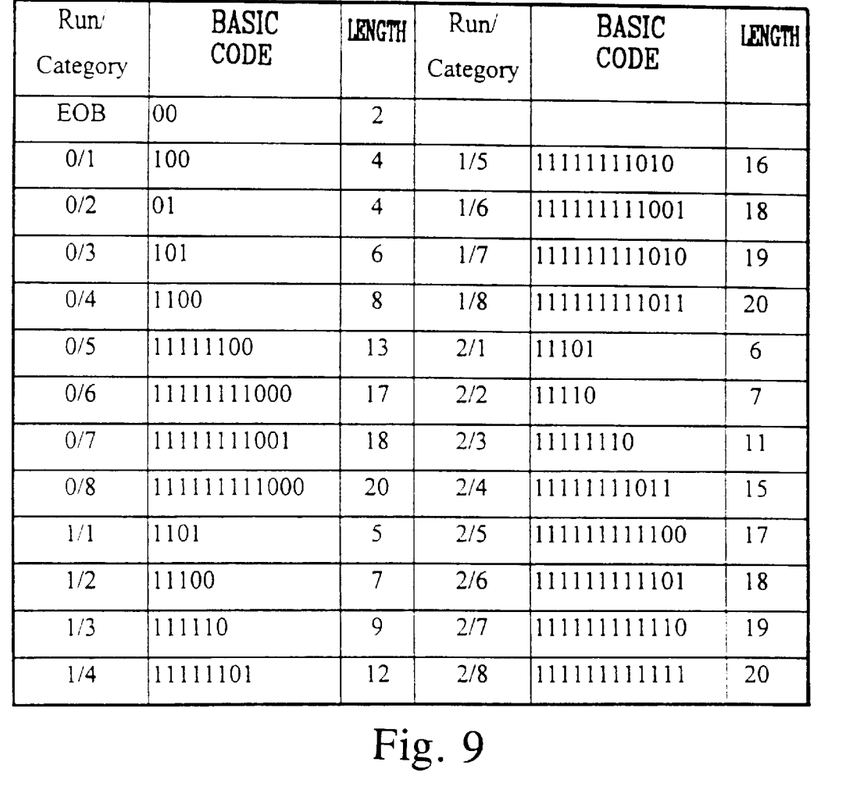
Figure 10:
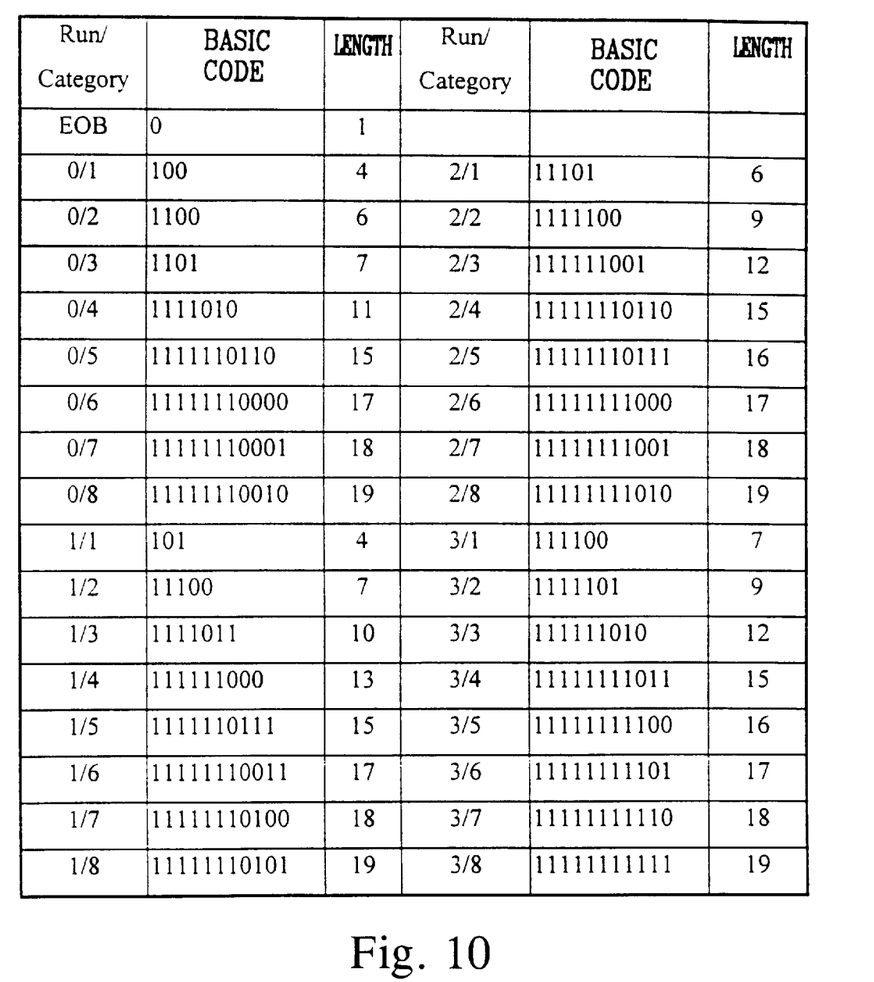
Figure 11:
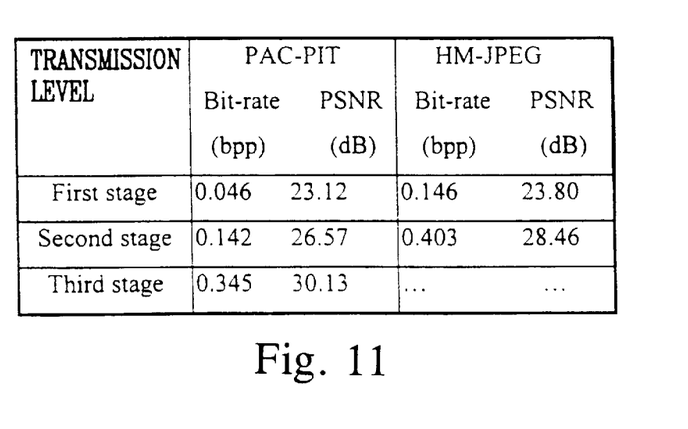

In this embodiment, two transmission models are provided. In the first model the size of image transmitted varies in each stage. FIG. 5(a) shows the reconstructed image of "Lena" with 128*128 pixels under the first stage of transmission. FIG. 5(b) shows the reconstructed image of "Lena" with 256*256 pixels under the second stage of transmission. In the second model, the size of image transmitted is constant in every stage. FIGS. 6(a)–6(c) respectively show the reconstructed image of "Lena" with 512*512 pixels under the first, second and third stages of transmission. As shown in the figure, the image as reconstructed in the third stage is a fine approximation of the original image (FIG. 4).

In order to assess the effects of this invention, a peak-signal-to-noise ratio (PSNR) is used. Here, PSNR is defined as:

$$PSNR = 10\log_{10}\left(\frac{255^2}{MSE}\right)$$

where MSE is the mean-square-error given by:

$$MSE = \frac{1}{N^2}\sum_{u=0}^{N-1}\sum_{v=0}^{N-1}[\hat{F}(u,v) - F(u,v)]^2$$

where F and $\hat{F}$ denote the original image and the reconstructed image respectively, and N denote the size of the image.

The PSNR and the bit-rates of the embodiments are shown in Table 5.

For comparison, the image "Lena" is processed with the conventional HM-JPEG technology and a 512*512 pixel image is constructed. The result is also shown in Table 5. As shown in Table 5, the PSNR of the present invention is higher than that of the HM-JPEG technology but the bit rate is about one third the latter.

EFFECTS OF THE INVENTION

As the residual images are approximated by continuous functions, the scaling property of the reconstructed images is well achieved. As shown in Table 5, the quality of the image as transmitted is higher than the conventional art while the bit-rate is reduced. The method of this invention may applied to a variety of applications and the coding system may also be revised according to the character of the image. In addition to this, other transmission approaches may also be applied to this invention. For example, in a browsing system, small-size images may be decoded into image indexes; In the iterative refining of the resolution, decoding can be conducted directly to constant size images.

While the present invention has been particularly shown and described with reference to preferred embodiments thereof, it will be understood by those skilled in the art that the foregoing and other changes in form and details may be made therein without departing from the spirit and scope of the invention.

What is claimed is:

1. A method for transmission of digital images in stages, comprising the following steps:

obtaining an image $f^1$ to be transmitted;

deciding the number of stages m and setting the variable of the stage k to 1;

dividing said image into N blocks wherein said N blocks are not overlapping one another;

down-sampling said image of said blocks;

encoding said down-sampled block image with the following equation:

$$f^k = Xb^k + e^k$$

wherein:

$f^k = [f_1, f_2, \ldots, f_n]$ represents an original data matrix with n elements and n>0;

$$X = \begin{bmatrix} 1 & x_1 & y_1 & x_1y_1 \\ 1 & x_2 & y_2 & x_2y_2 \\ \vdots & \vdots & \vdots & \vdots \\ 1 & x_n & y_n & x_ny_n \end{bmatrix}$$

is a constant matrix formed by the position variables;

$b^k = [\beta_0, \beta_1, \beta_2, \beta_3]$ is the coefficient matrix;

$e^k = [e_1, e_2, \ldots, e_n]$ is the error term matrix; and T represents number of the transmission stages;

quantifying said coefficient matrix $b^k$;

encodes the numeric numbers of the coefficients into variable-length codes;

transmits the encoded codes of the coefficients; and setting k=k+1 and N=N/2 and repeating the above steps to process the residual image $\hat{f}^{k+1}$, $\hat{f}^{k+1} = f^1 - \hat{f}^k$ until k is equal to m wherein $f^1$ denotes the original image and $\hat{f}^k$ denotes the reconstructed image.

2. The method according to claim 1 wherein $N = 2^{(m+1)} \times 2^{(m+1)}$.

3. The method according to claim 1 wherein said down-sampling is conducted with a 4*4 pixel mask.

4. The method according to claim 1 wherein said coefficients are quantified by their nearest integral numbers.

5. The method according to claim 1 wherein said coefficients are quantified with predicted numbers.

6. The method according to claim 1 wherein a look-up-table is used to encode the quantified coefficients.

7. The method according to claim 1 wherein the more frequently existing codes are encoded with shorter codes.

8. A device for transmission of digital images in stages, comprising:

an input device to obtain an image $f^1$ to be transmitted;

an initialization device to decide the number of stages m and to set the variable of the stage k to 1;

a sampling device to divide said image into N blocks wherein said N blocks are not overlapping one another;

a memory to store in-process or processed images;

a down-sampler to down-sample said image of said blocks;

a predictor to encode said down-sampled block image with the following equation:

$$f^k = Xb^k + e^k$$

wherein:

$f^k = [f_1, f_2, \ldots, f_n]$ represents an original data matrix with n elements and
n>0;

$$X = \begin{bmatrix} 1 & x_1 & y_1 & x_1y_1 \\ 1 & x_2 & y_2 & x_2y_2 \\ \vdots & \vdots & \vdots & \vdots \\ 1 & x_n & y_n & x_ny_n \end{bmatrix}$$

is a constant matrix formed by the position variables;

$b^k = [\beta_0, \beta_1, \beta_2, \beta_3]$ is the coefficient matrix;

$e^k = [e_1, e_2, \ldots, e_n]$ is the error term matrix; and T represents number of the transmission stages;

a quantifier to quantify said coefficient matrix $b^k$;

an encoder to encode the numeric numbers of the coefficients into variable-length codes;

a transmitter to transmit said encoded codes of the coefficients; and a resetting device to set k=k+1 and N=N/2.

9. The device according to claim 8 wherein $N=2^{(m+1)} \times 2^{(m+1)}$.

10. The device according to claim 8 wherein said down-sampler down-samples said image with a 4*4 pixel mask.

11. The device according to claim 8 wherein said quantifier quantifies said coefficients by their nearest integral numbers.

12. The device according to claim 8 wherein said quantifier quantifies said coefficients with predicted numbers.

13. The device according to claim 8 further comprising a look-up-table to be used to code said quantified coefficients.

14. The device according to claim 8 wherein said encoder encodes more frequently existing codes with shorter codes.

* * * * *